US011891290B2

(12) United States Patent
Dai et al.

(10) Patent No.: US 11,891,290 B2
(45) Date of Patent: Feb. 6, 2024

(54) HYDRAULIC CONTROL SYSTEM AND FORKLIFT

(71) Applicant: ZHEJIANG JIALIFT WAREHOUSE EQUIPMENT CO., LTD., Zhejiang (CN)

(72) Inventors: Xiaoxiao Dai, Huzhou (CN); Chunxi Chen, Huzhou (CN)

(73) Assignee: ZHEJIANG JIALIFT WAREHOUSE EQUIPMENT CO., LTD., Huzhou (CN)

( * ) Notice: Subject to any disclaimer, the term of this patent is extended or adjusted under 35 U.S.C. 154(b) by 940 days.

(21) Appl. No.: 15/930,409

(22) Filed: May 12, 2020

(65) Prior Publication Data

US 2020/0385254 A1 Dec. 10, 2020

(30) Foreign Application Priority Data

May 13, 2019 (CN) ........................ 201910391832.3

(51) Int. Cl.

| | |
|---|---|
| ***B66F 9/22*** | (2006.01) |
| ***B66F 9/12*** | (2006.01) |
| ***B66F 9/14*** | (2006.01) |
| ***B66F 9/16*** | (2006.01) |
| ***B66F 9/20*** | (2006.01) |

(52) U.S. Cl.

CPC ................ *B66F 9/22* (2013.01); *B66F 9/122* (2013.01); *B66F 9/146* (2013.01); *B66F 9/16* (2013.01); *B66F 9/205* (2013.01)

(58) Field of Classification Search

CPC .. B66F 9/22; B66F 9/122; B66F 9/146; B66F 9/16; B66F 9/205

USPC .......................................................... 700/282

See application file for complete search history.

(56) References Cited

U.S. PATENT DOCUMENTS

| | | | | |
|---|---|---|---|---|
| 10,710,855 B2 * | 7/2020 | Matsuo | .................. | B62D 5/065 |
| 2009/0082930 A1 * | 3/2009 | Peters | ..................... | E02F 3/432 701/50 |
| 2013/0313042 A1 * | 11/2013 | Freeman | ............... | B66F 11/044 700/282 |
| 2014/0088837 A1 * | 3/2014 | Heitmann | ............. | B66F 17/003 701/50 |
| 2017/0036900 A1 * | 2/2017 | Morita | ...................... | F15B 1/04 |
| 2018/0346301 A1 * | 12/2018 | Myers | ....................... | B66F 9/22 |
| 2019/0048864 A1 * | 2/2019 | Alfieri | ................... | F15B 21/085 |
| 2019/0264422 A1 * | 8/2019 | Kenkel | ..................... | E02F 9/26 |

* cited by examiner

*Primary Examiner* — Md Azad

(74) *Attorney, Agent, or Firm* — METIS IP LLC

(57) ABSTRACT

The present disclosure discloses a hydraulic control system. The hydraulic control system may include a hydraulic module, a PLC control module, a hydraulic valve group control module, a manipulation module, and an action module. The manipulation module is connected with the PLC control module and is configured to input an operation instruction to the PLC control module; the PLC control module is respectively connected to the hydraulic module and the hydraulic valve group control module, and is configured to output a control signal corresponding to the operation instruction to the hydraulic valve group control module, and control the activation of the hydraulic module to provide hydraulic pressure to the hydraulic valve group control module; and the action module is connected with the hydraulic valve group control module, and is configured to perform an action corresponding to the control signal.

12 Claims, 6 Drawing Sheets

HYDRAULIC CONTROL SYSTEM AND FORKLIFT

CROSS-REFERENCE TO RELATED APPLICATIONS

This application claims priority of Chinese Patent Application No. 201910391832.3, filed on May 13, 2019, the contents of which are incorporated herein by reference in their entirety.

TECHNICAL FIELD

The present disclosure relates to the technical field of a forklift, in particular to a hydraulic control system and a forklift including the hydraulic control system.

BACKGROUND

A forklift is an industrial transportation vehicle, which refers to various wheeled transportation vehicles for loading, unloading, stacking, and short-distance transportation of palletized goods. The forklift is often used for the transportation of large objects in a storage, usually driven by a fuel engine or a battery. It is widely used in ports, stations, airports, freight yards, factory workshops, warehouses, distribution centers, and distribution centers, etc. The forklift can enter the cabins, compartments, and containers for pallet cargo loading and unloading, transportation operations, etc. Thus, a forklift is an essential device in pallet transportation and container transportation.

In the actual transportation process, the forklift is limited by its position and the position of the object being transported. It is often necessary to adjust the position of the fork of the forklift according to the actual transportation scene. When adjusting the position of the fork, the fork may move in different directions. In order to realize the movement of the fork in different directions, the control system that drives the movement of the fork is often very complicated. For example, the oil circuit control in the motor circuit or the hydraulic system is troublesome. Therefore, it is desirable to provide a control system with a relatively simple structure to achieve a multi-directional movement of the fork of the forklift.

SUMMARY

According to an aspect of the present disclosure, a hydraulic control system is provided. The hydraulic control system includes a hydraulic module, a PLC control module, a hydraulic valve group control module, a manipulation module, and an action module. The manipulation module is connected with the PLC control module and is configured to input an operation instruction to the PLC control module; the PLC control module is respectively connected to the hydraulic module and the hydraulic valve group control module, and is configured to output a control signal corresponding to the operation instruction to the hydraulic valve group control module, and control the activation of the hydraulic module to provide hydraulic pressure to the hydraulic valve group control module, and the action module is connected with the hydraulic valve group control module, and is configured to perform an action corresponding to the control signal.

In some embodiments, the hydraulic valve group control module and the hydraulic module are provided as an integrated hydraulic valve assembly, and the hydraulic valve group control module is connected with the hydraulic module by a hose.

In some embodiments, the PLC control module is further configured to perform a signal processing on the operation instruction inputted by the manipulation module to determine the control signal corresponding to the operation instruction.

In some embodiments, the manipulation module includes at least one of a forward/backward switch, a tilt switch, a lateral moving switch, and a lift switch.

In some embodiments, the action module includes at least one of a forward/backward unit, a tilt unit, a lateral moving unit, and a lift unit; the forward/backward unit, the tilt unit, the lateral moving unit, and the lift unit respectively correspond to the forward/backward switch, the tilt switch, the lateral moving switch and the lift switch; the forward/backward unit is configured to receive the control signal from the PLC control module to cause a fork of a forklift to move forward or backward; the tilt unit is configured to receive the control signal from the PLC control module to cause the fork of the forklift to tilt forward or backward; the lateral moving unit is configured to receive the control signal from the PLC control module to cause the fork of the forklift to open toward both sides or contract toward the middle; the lift unit is configured to receive the control signal of the PLC control module to lift or lower the fork of the forklift.

In some embodiments, the forward/backward unit includes a forward solenoid valve and a backward solenoid valve, the forward solenoid valve, and the backward solenoid valve being electrically connected with the PLC control module respectively.

In some embodiments, the tilt unit includes a forward tilt solenoid valve and a backward tilt solenoid valve, the forward tilt solenoid valve, and the backward tilt solenoid valve being electrically connected with the PLC control module respectively.

In some embodiments, the lateral moving unit includes an opening solenoid valve and a contracting solenoid valve, the opening solenoid valve, and the contracting solenoid valve being electrically connected with the PLC control module respectively.

In some embodiments, the lift unit includes a lift solenoid valve and a lowering solenoid valve, the lift solenoid valve, and the lowering solenoid valve being electrically connected with the PLC control module respectively.

In some embodiments, at least one of the forward/backward switch, the tilt switch, the lateral moving switch, or the lift switch includes an action type and a motion parameter corresponding to the action type.

According to another aspect of the present disclosure, a forklift is provided. The hydraulic control system may be implemented on the forklift. The forklift includes a vehicle body, a fork, and a scissor assembly provided between the vehicle body and the fork; the hydraulic module and the PLC control module are provided on the vehicle body; a hydraulic valve group control module is provided between the fork and the scissor assembly; the manipulation module is connected with the PLC control module and is configured to input an operation instruction to the PLC control module, and the action module is connected with the hydraulic valve group control module, and is configured to perform an action corresponding to the control signal.

In some embodiments, the forklift further includes a gantry disposed at a front end of the vehicle body, and the scissor assembly is capable of moving up and down along the gantry.

In some embodiments, the forward/backward unit includes a forward/backward cylinder disposed on the scissor assembly, wherein one end of the forward/backward cylinder is rotatably connected with a slider of the scissor assembly, and another end of the forward/backward cylinder is rotatably connected with an inner fork plate of the scissor assembly.

In some embodiments, the tilt unit includes a tilt cylinder disposed between the fork and the scissor assembly.

In the present disclosure, by setting the PLC control module in the vehicle body, it is possible to write a program to the PLC control module according to user requirements. The wiring method is flexible and simple, and the PLC control module is used instead of multiple relay Solenoid valve control. When the mechanical multi-way valve is used for switching and controlling the oil circuit. The multi-way valve is limited by the position, and the assembly is dull. It adds many limitations to the design of the vehicle. There are many oil pipes on the multi-way valve. There are certain difficulties in the relay and repair. Solenoid valve control wiring is complicated, and the more complicated oil circuit control is more troublesome; it can distribute the solenoid valve in different parts of the car body according to different models, which provides convenience for the diversified design of the vehicle. At the same time, the control system is stable and the control methods are diverse, which may provide a good solution for the switching of the oil circuit system.

In the present disclosure, the hydraulic module and the PLC control module are arranged inside the vehicle body, and the hydraulic valve group control module is arranged between the fork and the scissor assembly, so that the oil line connection between the hydraulic valve group control module, the forward and backward unit between the tilting unit and the side shifting unit is shortened, thus reducing the long-distance arrangement of the oil path and optimizing the mechanism. In addition, by setting the pulley block on the oil line connection between the hydraulic valve block control module and the lifting unit, the oil path can slide relative to the pulley block during the operation of the forklift to avoid the situation that the hose is pulled and bent.

In the present disclosure, the fork is mounted on the front end of the scissor assembly and can be rotated at a certain angle, so that it can be rotated at a small angle along the front end of the scissor assembly under the driving of the tilting cylinder, without requiring the entire forklift The front support structure is tilted and turned, which is simpler and more compact and more stable.

In summary, the present disclosure has one or more advantages, such as a stable control, multiple control methods, compact structure, low cost, reasonable layout, etc. it is especially suitable for the technical field of forklifts.

BRIEF DESCRIPTION OF THE DRAWINGS

In order to more clearly explain the technical solutions of the embodiments of the present disclosure, the drawings required in the description of the embodiments will be briefly introduced below. Obviously, the drawings described below are only some embodiments of the present disclosure. For those ordinary skilled in the present technical field, other drawings may be obtained based on these drawings without creative work.

DETAILED DESCRIPTION

Figure 1:
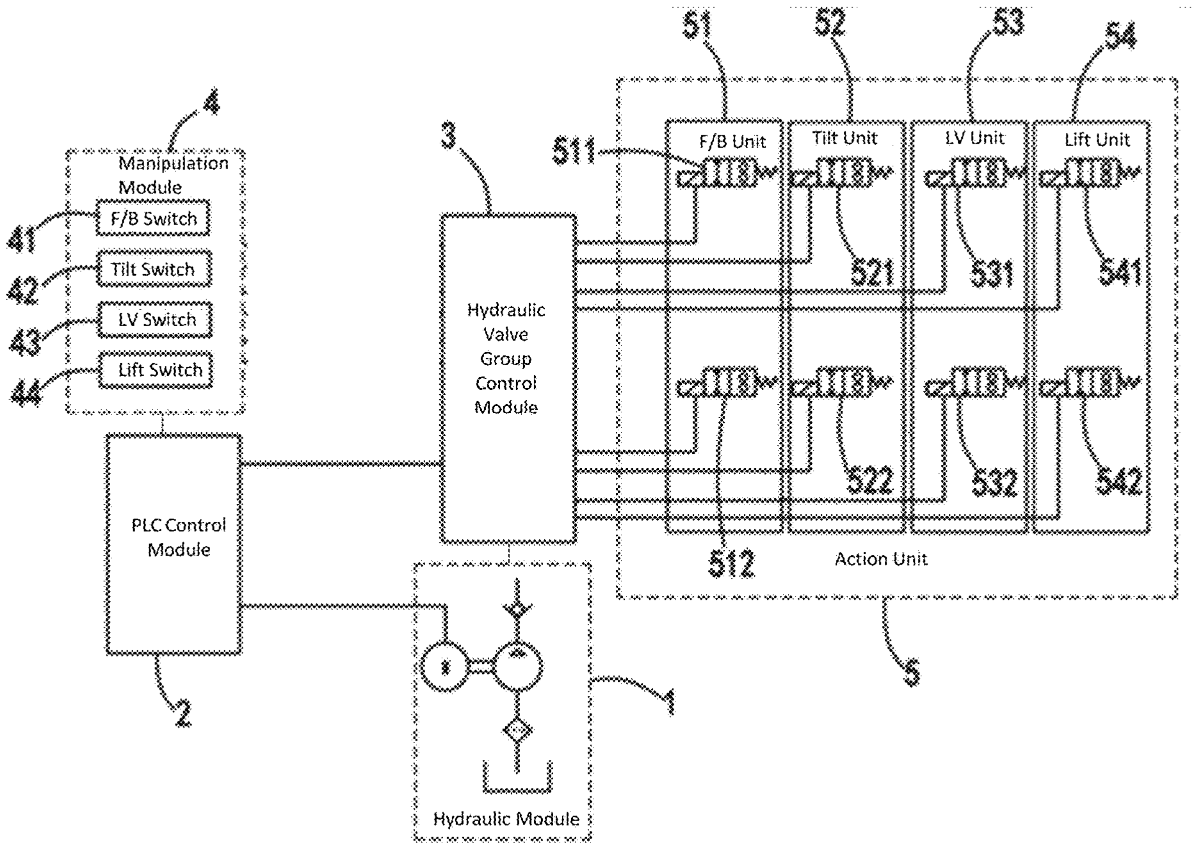
FIG. 1 is a block schematic diagram illustrating a hydraulic control system according to some embodiments of the present disclosure.

Hereinafter, embodiments of the present disclosure will be described in detail. Examples of the embodiments are shown in the drawings, in which the same or similar reference numerals indicate the same or similar elements or elements having the same or similar functions. The embodiments described below with reference to the drawings are exemplary, and are intended to explain the present disclosure, and should not be construed as limiting the present disclosure.

In some embodiments, the fork movement of the forklift may be caused by the motor driving the folding frame to expand and contract, so that the folding frame may drive the fork to move forward and backward, which is convenient for loading the goods, and may not require the overall movement of the forklift; it may be stable to perform sliding expansion and contraction, it may be stronger flexible and easy to operate, it may be lower production cost, and it may be lower forklift weight. However, its telescopic structure only has the function of moving forward and backward, and relies on the drive of the motor, and the motor circuit is troublesome to set up. In some embodiments, in order to add other actions such as lateral moving to the forklift, a mechanical multi-way valve or a relay may be required to cooperate with the solenoid valve control. The multi-way valve is limited by the position and the assembly is dull, which adds many limitations to the design of the vehicle, there are many oil pipes on the multi-way valve, and assembly and maintenance are difficult. The wiring between relay and solenoid valve control is complicated, which is a troublesome problem for the more complicated oil circuit control.

In order to solve the problems of the limitation of a single movement direction and the complicated structure of the fork of the forklift, the embodiment of the present disclosure provides a hydraulic control system, which uses a PLC control module and a solenoid valve to control the hydraulic system. According to different vehicle models, the hydraulic control module may be installed inside the vehicle body, and the solenoid valves may be distributed in different parts of the vehicle body, which provides more convenience for the diversified design of the vehicle. At the same time, the control system is stable and the control methods are diverse, which can be regarded as an effective solution for the switching of the oil circuit system.

The technical solutions in the embodiments of the present disclosure will be clearly and completely described below with reference to the drawings.

Embodiment One

As shown in FIG. 1, the hydraulic control system may include a hydraulic module 1, a PLC control module 2, a hydraulic valve group control module 3, a manipulation module 4, and an action module 5. The manipulation module 4 may be connected with the PLC control module 2 and be configured to input an operation instruction to the PLC control module 2; the PLC control module 2 may be respectively connected to the hydraulic module 1 and the hydraulic valve group control module 3, and be configured to output a control signal corresponding to the operation instruction to the hydraulic valve group control module 3, and control the activation of the hydraulic module 1 to provide hydraulic pressure to the hydraulic valve group control module 3, and the action module 5 may be connected with the hydraulic valve group control module 3, and be configured to perform an action corresponding to the control signal.

In some embodiments, the PLC control module 2 may be connected to each solenoid valve in the action module 5 through the hydraulic valve group control module 3 to control the supply of the current of each solenoid valve.

In some embodiments, the hydraulic module 1 may supply oil to the entire hydraulic control system. Specifically, the hydraulic module 1 may supply oil to the hydraulic valve group control module 3, so as to supply oil to the entire hydraulic control system. In some embodiments, the hydraulic module 1 may include at least an electric motor, a hydraulic pump, and an oil tank. The electric motor may drive the hydraulic pump to suck hydraulic oil from the oil tank, and the hydraulic pump may convert the mechanical energy of the electric motor to the pressure kinetic energy of the hydraulic oil (represented as a pressure, a flow), so as to provide hydraulic oil for the entire hydraulic control system and provide power to the entire system.

In some embodiments, the PLC control module 2 may perform signal processing on the operation instruction issued by the manipulation module 4 to determine the control signal corresponding to the operation instruction, and then send outputs to the hydraulic module 1, the hydraulic valve group control module 3, and the action module 5, so that the relevant device may perform the action corresponding to the operation instruction issued by the manipulation module 4. In some embodiments, the PLC control module 2 may include a central processing unit (CPU), a memory, an input unit, and an output unit. As used herein, the input unit may receive the instruction issued by the manipulation module 4; the central processing unit may process the instruction received by the input unit and convert it into a control signal that the hydraulic valve group control module 3 or multiple solenoid valves can recognize; the memory may store above instructions or the programs for signal processing pre-stored in the PLC; the output unit may output the control signal to the controlled module or device (e.g., the hydraulic module 1, the hydraulic valve group control module 3, and the action module 5). In some embodiments, the user may program and execute the PLC control module 2 according to the user's own usage requirements (e.g., the corresponding device needs to move in a certain direction, how much distance and time to move, etc.).

In some embodiments, the hydraulic valve group control module 3 may receive the control signal output by the PLC control module 2 and the oil provided by the hydraulic module 1, and control the switch of each hydraulic valve according to the control signal, so as to adjust the pressure, flow and direction of the oil in the entire system. In some embodiments, the hydraulic valve control group module 3 may include at least a variety of hydraulic valves, such as flow valves, directional valves, pressure valves, or the like.

In some embodiments, the hydraulic valve group control module 3 and the hydraulic module 1 may be provided as an integrated hydraulic valve assembly. As used herein, the PLC control module 2 may be respectively connected to the hydraulic valve group control module 3 and the hydraulic module 1 through a circuit. In some embodiments, the hydraulic valve group control module 3 may be connected with the hydraulic module 1 by a hose. The hose may transmit the oil provided by the hydraulic module 1 to the hydraulic valve group control module 3. Specifically, the hydraulic module 1 and the hydraulic valve group module may receive control signals from the PLC control module 2 respectively, and the control signals may be configured to control the oil supply switch in the hydraulic module 1 and various hydraulic valves switch in the hydraulic valve group control module 3, and the supply of the current of one or more solenoid valves in the action module 5, so that the direction of the hydraulic oil coming out of the hydraulic module 1 and passing through the hydraulic valve group module may be adjusted, so as to realize related device (e.g., the fork of the forklift) to perform actions corresponding to the control signal (e.g., forward/backward, lifting-lowering, tilt, etc.). In some embodiments, the control signal may also be configured to control the flow or pressure of the hydraulic oil.

In some embodiments, the manipulation module 4 may send the PLC control module 2 an operation instruction input by the user (e.g., at least one of a forward/backward instruction, a tilt instruction, a lateral moving instruction, and a lifting/lowering instruction), so that the corresponding device may perform the corresponding movements. The manipulation module 4 may include at least one of a forward/backward (F/B) switch 41, a tilt switch 42, a lateral moving (LV) switch 43, and a lift switch. In some embodiments, at least one of the forward/backward switch 41, the tilt switch 42, the lateral moving switch 43, and the lift switch 44 may include an action type (including forward, backward, forward tilt, backward tilt, up, down, open toward both sides or contract toward the middle) and the motion parameters corresponding to the action type (e.g., the motion displacement and motion speed corresponding to the forward motion; the tilt angle and tilt speed corresponding to the tilt motion, etc.). The action-type may be understood as the movement mode of the related device (e.g., the fork of the forklift), including but not limited to the forward/backward, the lifting/lowering, the lateral moving, the tilt, etc. mentioned in the previous section.

In some embodiments, the manipulation module 4 may be a handle-type button or an input interface (e.g., a touch screen). In some embodiments, the operation instruction input by the user to the manipulation module 4 may include the action type. In some embodiments, the operation instruction may further include motion parameters corresponding to the action type (e.g., motion displacement, motion speed; tilt angle, tilt speed, etc.), so that the corresponding device may perform the action type corresponding to the operation instruction and may accurately move according to the input motion parameters.

In some embodiments, the manipulation module 4 may be a part of the PLC control module 2, for example, the man-machine interface (e.g., a touch screen, a computer, etc.) included in the PLC control module 2 may be configured as the manipulation module 4, and the user may use the man-machine interface of the PLC control module 2 to input operation instructions and/or corresponding motion parameters.

In some embodiments, the action module 5 may be connected with the hydraulic valve group control module 3 to be able to drive the corresponding device to act (at least one of forward/backward, tilt, lateral moving and lifting/lowering) corresponding to the instruction sent by the manipulation module 4. In some embodiments, the action module 5 may receive the control signal determined by the PLC control module 2 through the hydraulic valve group control module 3. In some embodiments, the action module 5 may also directly receive the control signal from the PLC control module 2, that is, the action module 5 may be directly connected with the PLC control module 2. In some embodiments, the action module 5 may include a forward/backward unit 51, a tilt unit 52, a lateral moving unit 53, and a lift unit 54. As used herein, the forward/backward unit 51, the tilt unit 52, the lateral moving unit 53, and the lift unit 54 correspond to the forward/backward switch 41, the tilt switch 42, the lateral moving switch 43, and the lift switch 44 respectively. When the manipulation module 4 turns on one of the forward/backward switch 41, the tilt switch 42, the lateral moving switch 43, and the lift switch, the motion module may correspondingly trigger one of the forward/backward unit 51, the tilt unit 52, the lateral moving unit 53, and the lift unit 54.

It should be noted that the above description of each module is only for the convenience of description, and does not limit this specification to the scope of the illustrated embodiments. It can be understood that, for those skilled in the art, after understanding the principle of the system, it is possible to arbitrarily combine various modules without departing from this principle. For example, the hydraulic module 1, the PLC control module 2, the hydraulic valve group control module 3, the manipulation module 4 and the action module 5 in the present disclosure may be different modules in a system, or a module to realize the functions of above two or more modules. For example, the PLC control module 2 may be one module, or two modules having an operation instruction input function and a control signal output function, respectively. For another example, the PLC control module 2 and the manipulation module 4 may be one module. For another example, the hydraulic valve group control module 3 and the action module 5 may be one module. For another example, the hydraulic valve group control module 3 and the hydraulic module 1 may be one module. For another example, the hydraulic valve group control module 3, the hydraulic module 1, and the action module 5 may be one module.

In some embodiments, the forward/backward unit 51 may be configured to receive the control signal of the PLC control module 2 to realize the forward or backward movement of the fork of the forklift. In some embodiments, the tilt unit 52 may be configured to receive the control signal of the PLC control module 2 to realize the forward tilt or backward tilt of the fork of the forklift. In some embodiments, the lateral moving unit 53 may be configured to receive the control signal of the PLC control module 2 to realize that the fork of the forklift is open toward both sides or contract toward the middle. In some embodiments, the lift unit 54 may be configured to receive the control signal of the PLC control module 2 to lift or lower the fork of the forklift. It should be noted that the forward, backward, up, and down directions mentioned in the present disclosure may refer to the coordinate directions shown in FIG. 4. The direction of opening or contracting may refer to the direction B shown in FIG. 2. The direction of forward tilt or backward tilt may refer to the direction R shown in FIG. 4.

Figure 4:
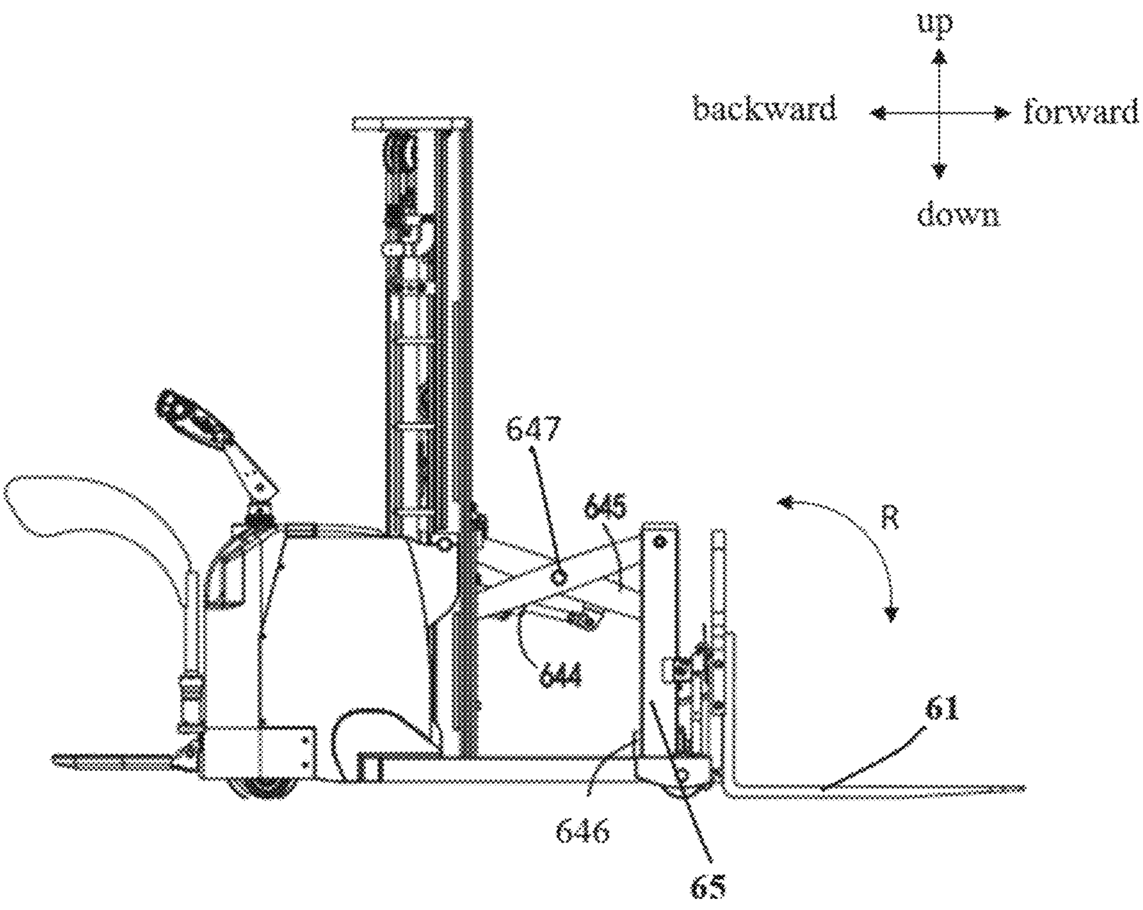
FIG. 4 is a diagram illustrating a side view of a forklift according to some embodiments of the present disclosure.
Figure 5:
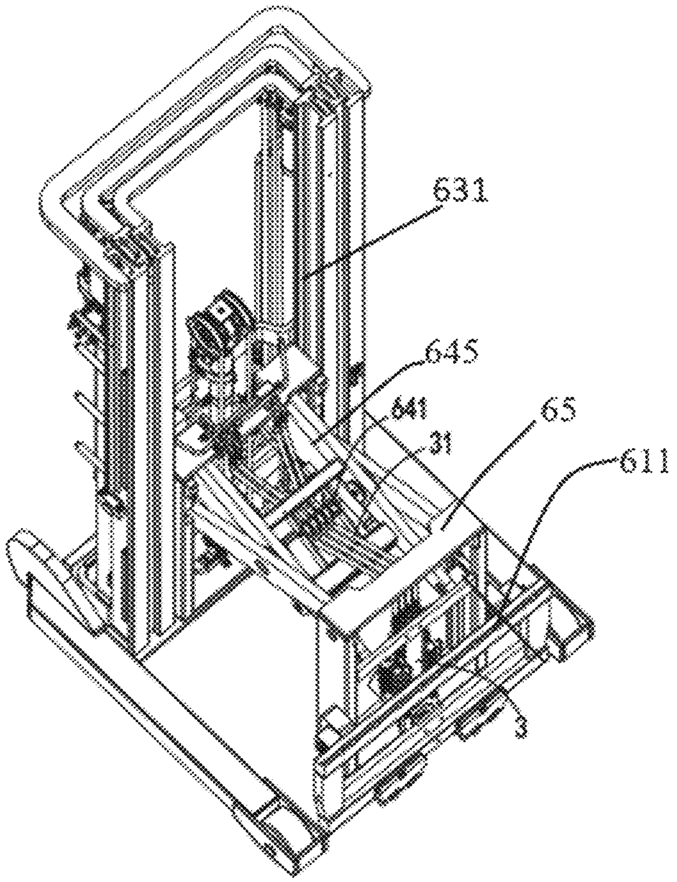
FIG. 5 is a schematic diagram illustrating a partial structure of the gantry according to some embodiments of the present disclosure.
Figure 6:
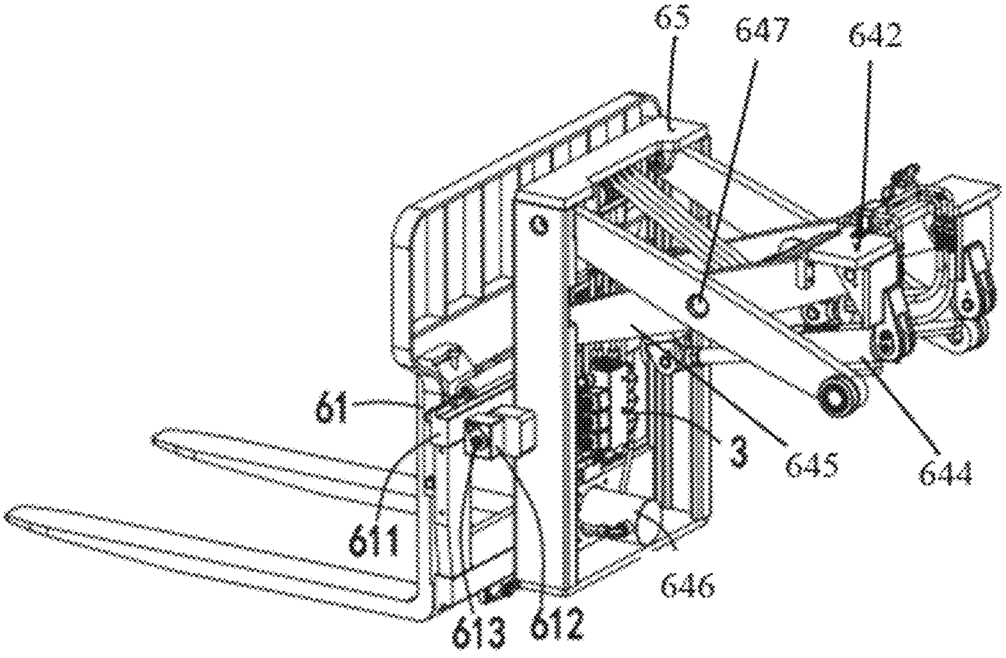
FIG. 6 is a schematic diagram illustrating a structure of a scissor assembly according to some embodiments of the present disclosure.

In some embodiments, the forward/backward unit 51 may include a forward solenoid valve 511 and a backward solenoid valve 512 that are electrically connected to the PLC control module 2 respectively. In some embodiments, the forward/backward unit 51 may further include a forward/backward cylinder connected to the forward solenoid valve 511 and the backward solenoid valve 512 (as shown in FIG. 4 and FIG. 6). Specifically, the PLC control module 2 and the solenoid valve in the forward/backward unit 51 may be electrically connected to control the supply of the current of the forward solenoid valve 511 and the backward solenoid valve 512; the forward solenoid valve 511 and the backward solenoid valve 512 and the hydraulic valve group may be connected with the PLC control module 2 and the forward/backward cylinder through the oil pipe. When the forward solenoid valve 511 or the backward solenoid valve 512 is energized, the valve of the forward solenoid valve 511 or the backward solenoid valve 512 may be opened, and the hydraulic oil coming from the hydraulic valve group control module 3 may enter the forward/backward cylinder through the forward solenoid valve 511 or the backward solenoid valve 512 The forward/backward cylinder then may perform a telescopic movement by the pressure of the hydraulic oil, thereby achieving forward or backward movement of the fork. Details about how the forward/backward cylinder may realize the forward or backward movement of the fork may be found elsewhere, for example, in the description of the Embodiment two.

In some embodiments, the tilt unit 52 may include a forward tilt solenoid valve 521 and a backward tilt solenoid valve 522, which are electrically connected to the PLC control module 2 respectively. In some embodiments, the tilt unit 52 may further include a forward/backward cylinder (as shown in FIG. 4 and FIG. 6) connected to the forward tilt solenoid valve 521 and the backward tilt solenoid valve 522. Specifically, the PLC control module 2 may be electrically connected to the solenoid valve in the tilt unit 52 to control the supply of the current of the forward tilt solenoid valve 521 and the backward tilt solenoid valve 522; the forward tilt solenoid valve 521 and the backward tilt solenoid valve 522 may be connected with the hydraulic valve group control module 3 and the tilt cylinder. When the forward tilt solenoid valve 521 or the backward tilt solenoid valve 522 is energized, the valve of the forward tilt solenoid valve 521 or the backward tilt solenoid valve 522 may open, and the hydraulic oil coming from the hydraulic valve group control module 3 may enter the tilt cylinder through the forward tilt solenoid valve 521 or the backward tilt solenoid valve 522, and the tilt cylinder then may perform a telescopic movement by the pressure of the hydraulic oil, thereby achieving forward tilt or backward tilt of the fork. For details about how the forward/backward cylinder realizes the forward tilt or backward tilt of the fork refer to the description of Embodiment three.

Figure 2:
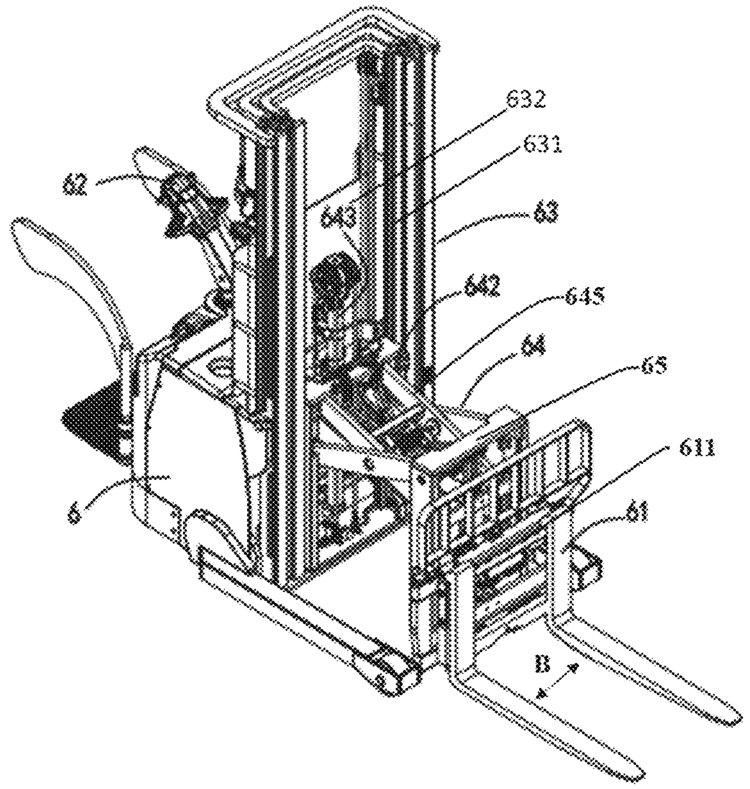
FIG. 2 is a schematic diagram illustrating a structure of a forklift according to some embodiments of the present disclosure.
Figure 3:
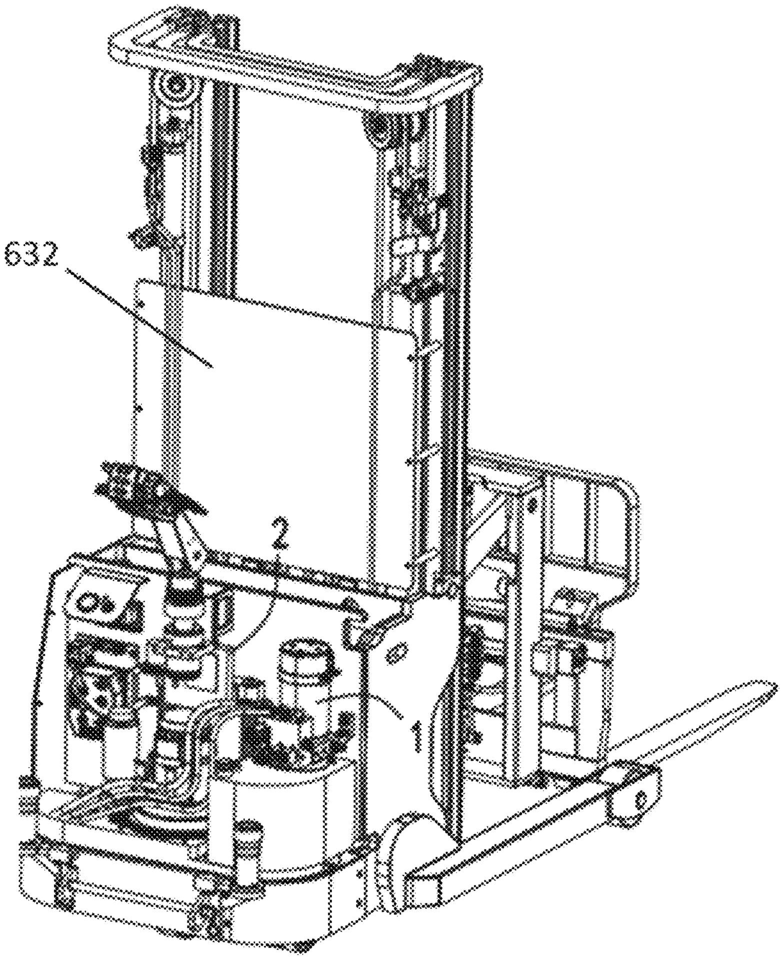
FIG. 3 is a schematic diagram illustrating an internal structure of a vehicle body of a forklift according to some embodiments of the present disclosure.

In some embodiments, the lateral moving unit 53 may include an opening solenoid valve 531 and a contracting solenoid valve 532, which are electrically connected to the PLC control module 2 respectively. In some embodiments, the lateral moving unit 53 may further include a lateral moving bidirectional cylinder (not shown in the figure) connected to the opening solenoid valve 531 and the contracting solenoid valve 532, respectively. Specifically, the PLC control module 2 and the solenoid valve in the lateral moving unit 53 may be electrically connected to control the supply of the current of the opening solenoid valve 531 or the contracting solenoid valve 532; the opening solenoid valve 531 and the contracting solenoid valve 532 may be connected with the hydraulic valve group control module 3 and the two-way cylinder through the oil pipe. When the opening solenoid valve 531 or the contracting solenoid valve 532 is energized, the valve of the opening solenoid valve 531 or the contracting solenoid valve 532 may be opened, and the hydraulic oil coming from the hydraulic valve group control module 3 may enter the lateral moving bidirectional cylinder through the opening solenoid valve 531 or the contracting solenoid valve 532, and the lateral moving bidirectional cylinder then may telescopically move by the pressure of hydraulic oil, so that the fork in the B direction (as shown in FIG. 2) may open toward both sides or contract toward the middle. For details about how the lateral moving bidirectional cylinder realizes that the fork is open toward both sides or contract toward the middle refer to the description of the Embodiment two.

In some embodiments, the lift unit 54 may include a lift solenoid valve 541 and a lowering solenoid valve 542 that are electrically connected to the PLC control module 2 respectively. In some embodiments, the lift unit 54 may further include a lift cylinder 643 (shown in FIG. 2) connected to the lift solenoid valve 541 and the lowering solenoid valve 542 respectively. Specifically, the PLC control module 2 may be electrically connected to the solenoid valve in the lift unit 54 to control the supply of the current of the lift solenoid valve 541 or the lowering solenoid valve 542; the lift solenoid valve 541 and the lowering solenoid valve 542 may be connected with the PLC control module 2 and the lift cylinder 643 through the oil pipe. When the lift solenoid valve 541 or the lowering solenoid valve 542 is energized, the valve of the lift solenoid valve 541 or the lowering solenoid valve 542 may be opened, and the hydraulic oil coming from the hydraulic valve group control module 3 may enter the lift cylinder 643 through the lift solenoid valve 541 or the lowering solenoid valve 542. The lift cylinder 643 may telescopically move, driven by the pressure of the hydraulic oil, thereby realizing the lifting or lowering of the fork of the forklift. For details on how the lift cylinder 643 realizes the lifting or lowering of the fork refer to the description of the Embodiment two.

Since the PLC control module 2 is used in the hydraulic control system in the embodiment of the present disclosure, the user may directly input operation instructions for the fork of the forklift to forward/backward, lateral tilt, lateral moving and lifting/lowering by the manipulation module 4, and then the PLC control module 2 may receive the above operation instructions, and process the operation instructions and determine the control signals corresponding to the operation instructions, and then output control signals to the hydraulic module 1, the hydraulic valve group control module 3, and the action module 5, to respectively control the activation of the hydraulic module 1, the switch of each hydraulic valve in the hydraulic valve group control module 3, and the current of the solenoid valve included in each action unit in the action module 5, thereby controlling the movement of the cylinder connected to the solenoid valve, so that the fork may perform an action corresponding to the operation instruction input by the user.

It is worth mentioning that, by setting the PLC control module 2 in the vehicle body, it is possible to write programs to the PLC control module 2 according to user requirements. The wiring way may be flexible and simple, and the PLC control module 2 may be configured to replace multiple relays with electromagnetic valve control, which overcomes the mechanical multi-way valve to switch and control the oil circuit. The multi-way valve is limited by the position and the assembly is dull, which adds many limitations to the design of the vehicle. There are certain difficulties for assembling and repairing due to many oil pipes in the multi-way valve; the relay and solenoid valve control wiring is complicated, and the more complicated oil circuit control is more troublesome; it may distribute the solenoid valve in different parts of the vehicle body according to different vehicle models, which provides convenience for the diversified design of the vehicle. At the same time, the control system may be stable and the control ways are diverse, providing a good solution for the switching of the oil circuit system.

Embodiment Two

Some embodiments of the present disclosure also provide a forklift that may use the hydraulic system in one or more of the foregoing embodiments. In some embodiments, the forklift may also be configured as a stacker truck. As shown in FIG. 2 to FIG. 6, a forklift may include a vehicle body 6, a fork 61, an operating rod 62 provided on the vehicle body 6, and a gantry 63 provided on the front end of the vehicle body 6, the gantry 63 may include an inner gantry 631 and a back plate 632. The inner gantry 631 may be provided with a scissor assembly 64 that can move up and down along the inner gantry 631. The front end of the scissor assembly 64 may be provided with a fork frame 65. The fork 61 may be connected with the fork frame 65, the hydraulic valve group control module may be provided at the fork frame 65, and the hydraulic module and the PLC control module may be both disposed inside the vehicle body 6. As used herein, the fork 61 may be usually configured to carry the goods; the fork frame 65 may be configured to load the fork 61; the operating rod 62 may be connected with the PLC control module, the user may input commands to the operating rod 62 to control the movement of the fork 61 of the forklift. In some embodiments, the operating rod 62 may be configured as a handle of the forklift, which is convenient for the user to push the entire forklift to move. In some embodiments, the PLC control module may include a man-machine interface, which may replace the operating rod 62. In some embodiments, the hydraulic module may include at least the electric motor, the hydraulic pump, and the oil tank, and the PLC control module may be a general-purpose PLC controller.

In some embodiments, the hydraulic valve group control module may be disposed between the fork 61 and the scissor assembly 64. Specifically, the hydraulic valve group control module may be provided on the fork 61 or the scissor assembly 64, for example, on the front end of the scissor assembly 64, or on elements between the fork 61 and scissor assembly 64, for example, may be provided on the fork frame 65.

In some embodiments, by disposing the hydraulic module and the PLC control module inside the body of the vehicle body 6, and disposing the hydraulic valve group control module at the fork frame 65, the hydraulic valve group control module and the oil line connection between the forward/backward unit 51, tilt unit 52 and the lateral moving unit 53 may be shortened, the long-distance arrangement of the oil line may be reduced and the mechanism may be optimized. In addition, a pulley block may be provided on the oil line connection between the hydraulic valve group control module and the lift unit 54, so that the oil line may slide relative to the pulley block during the operation of the forklift to avoid the situation of hose pulling and bending.

Specifically, the scissor assembly 64 may be provided with a pulley block 641, and the hose 31 may bypass the pulley block 641.

In some embodiments, the scissor assembly 64 may be provided with a slider 642 on the side of the vehicle body 6. The scissor assembly 64 may move up and down as a whole, thereby driving the fork frame 65 and the fork 61 to move up and down as a whole.

In some embodiments, the scissor assembly 64 may be provided with a forward/backward cylinder 644, and the fork frame 65 may be provided with a sliding frame 611. One end of the forward/backward cylinder 644 may be rotatably connected to the slider 642, and the other end of the forward/backward cylinder 644 may be connected with and the inner fork plate 645 of the scissor assembly 64. The inner fork plate 645 may rotate. The end of the inner fork plate 645 near the fork frame 65 may slide up and down on the fork frame 65, while the other end of the inner fork plate 645 may be fixedly connected to the slider 642. When sliding up and down, the end of the inner fork plate 645 connected to the slider 642 may also slide up and down in the same direction as the slider 642. The slider 642 and the inner fork plate 645 may be provided with a slider 642 at the end near the fork frame 65, and the inner gantry 631 and the fork frame 65 are provided with a guide rail, so that one end of the slider 642 and the inner fork plate 645 closing to the fork frame 65 may slide up and down on the inner gantry 631 and the fork frame 65, respectively. Specifically, when the forward/backward cylinder 644 is telescopically moved, the two ends of the inner fork plate 645 may be slid up and down by rotating the two ends of the forward/backward cylinder 644 and the inner fork plate 645, so that the inner fork plate 645 may rotate around the scissor shaft 647, so that the opening of the scissor assembly 64 toward the fork 61 may increase or decrease. When the opening of the scissor assembly 64 increases toward the fork 61, the scissor assembly 64 may drive the fork 61 back; when the opening of the scissor assembly 64 toward the fork 61 decreases, the scissor assembly 64 may drive the fork 61 forward.

In some embodiments, the scissor assembly 64 may be provided with a slider 642 on the side of the vehicle body 6, and the lift cylinder 643 may be disposed on the back plate 632. The inner gantry 631 may slide up and down, thereby driving the whole lifting movement of the scissor assembly 64, so as to drive the whole lifting movement of the fork frame 65 and the fork 61.

In some embodiments, the lateral moving unit 53 may include a lateral moving bidirectional cylinder disposed on the front side of the hydraulic valve group control module, the sliding frame 611 may be provided between the fork frame 65 and the fork 61, and the lateral moving bidirectional cylinder may drive the fork 61 carried on the sliding frame 611 to open or contract in the direction B. In some embodiments, the fork 61 may be provided with a slider 642, and the sliding frame 611 may be provided with a guide rail, so that the fork 61 may slide on the sliding frame 611. In some embodiments, the lateral moving bidirectional cylinder may be replaced by two one-way cylinders. The two one-way cylinders may control the movement of the two forks 61 in the opposite direction in the B direction, so that the fork 61 may be oriented in the B direction. The fork 61 may open toward both sides or contract toward the middle, so that the distance between the two forks 61 may be adjusted.

Embodiment Three

As shown in FIG. 6, the same or corresponding components in Embodiment two are denoted by the corresponding reference numerals in Embodiment two. For the sake of simplicity, only the differences from Embodiment two are described below; the difference between the Embodiment three and Embodiment two is that the tilt cylinder 646 may be disposed between the fork and the scissor assembly 64. Specifically, it may be provided on the fork, the scissor assembly 64, or the element between the fork and the scissor assembly 64, such as the fork frame 65. In some embodiments, the tilt cylinder 646 may be disposed near the hydraulic valve group control module, specifically, the tilt cylinder 646 may be disposed above, below, two sides, etc. of the hydraulic valve group control module. The oil line connection between the tilt cylinder 646 and the hydraulic valve group control module may be shortened and the overall structure of the forklift may be optimized.

In some embodiments, a rotating block 612 and a rotating shaft 613 may be provided on both sides of the fork frame 65, the rotating block 612 and the rotating shaft 613 may be rotationally connected, and the sliding frame 611 connected to the fork in a sliding way may be fixedly connected with the rotating block 612, the piston rod (not shown) of the tilt cylinder 646 may be connected with the fork. Specifically, when the tilt cylinder 646 is in operation, the piston rod of the tilt cylinder 646 may apply a push-pull force to the fork in its telescopic direction. When the fork receives the push-pull force, due to the rotating block 612 and the rotating shaft 613 is a rotating connection, and the rotating block 612 also receives the pushing and pulling force to rotate around the rotating shaft 613 in the R direction, but cannot move in the direction of the pushing and pulling force, so that the sliding frame 611 fixedly connected to the rotating block 612 and the fork carried on the sliding frame 611 may rotate with the rotating block 612 around the rotating shaft 613 in the R direction by a certain angle. The angle is determined by the displacement of the fork driven by the tilt cylinder 646, so that the fork may be forward tilt and backward tilt. In this way, the fork may be rotated by the tilt cylinder 646 along the fork frame 65 at a small angle without tilting and rotating the entire front support structure of the forklift, and the structure may be simpler, more compact and more stable.

In the present disclosure, it should be understood that the terms "center", "longitudinal", "transverse", "length", "width", "thickness", "upper", "lower", "front", "back"", "left", "right", "vertical", "horizontal", "top", "bottom", "inner", "outer", "clockwise", "counterclockwise", etc. The relationship is based on the orientation or positional relationship shown in the drawings, and is only for the convenience of describing the present disclosure and simplifying the description, rather than indicating or implying that the specified device or element must have a specific orientation, structure, and operation in a specific orientation. Therefore, it cannot be understood as a restriction on the present disclosure.

In addition, the terms "first" and "second" are used for descriptive purposes only, and cannot be understood as indicating or implying relative importance or implicitly indicating the number of technical features indicated. Therefore, features defined as "first" and "second" may explicitly or implicitly include one or more of the features. In the description of the present disclosure, "a plurality of" means two or more, unless otherwise specifically defined.

The above is only the preferred specific embodiment of the present disclosure, but the scope of protection of the present disclosure is not limited to this, and any person skilled in the art may easily think of or replace changes under the technical prompt of the present disclosure. For example, by arranging the preforms with the opening facing upward, the preforms are positioned by the preform supply mechanism after positioning the preforms by the transfer mechanism, the negative pressure may be adsorbed and fixed after positioning the preform bottle mouth, and then the phase analysis may be conducted to realize the detection of the bottle mouth and the peripheral surface of the bottle body, the design concept should be covered by the protection scope of the present disclosure. Therefore, the protection scope of the present disclosure should be subject to the protection scope of the claims.

What is claimed is:

1. A hydraulic control system comprising a hydraulic module, a PLC control module, a hydraulic valve group control module, a manipulation module, and an action module, wherein the manipulation module is connected with the PLC control module and is configured to input an operation instruction to the PLC control module, wherein the manipulation module includes a forward/backward switch, a tilt switch, a lateral moving switch, and a lift switch;

the PLC control module is respectively connected to the hydraulic module and the hydraulic valve group control module, and is configured to output a control signal corresponding to the operation instruction to the hydraulic valve group control module, and control activation of the hydraulic module to provide hydraulic pressure to the hydraulic valve group control module; and the action module is connected with the hydraulic valve group control module, and is configured to perform an action corresponding to the control signal, wherein the action module includes a forward/backward unit, a tilt unit, a lateral moving unit, and a lift unit; and the forward/backward unit, the tilt unit, the lateral moving unit and the lift unit respectively correspond to the forward/backward switch, the tilt switch, the lateral moving switch and the lift switch, wherein a pulley block is provided on an oil line connection between the hydraulic valve group control module and the lift unit, wherein the forward/backward unit is configured to receive the control signal from the PLC control module to cause a fork of a forklift to move forward or backward;

the tilt unit is configured to receive the control signal from the PLC control module to cause the fork of the forklift to tilt forward or backward;

the lateral moving unit is configured to receive the control signal from the PLC control module to cause the fork of the forklift to open toward both sides or contract toward the middle; and the lift unit is configured to receive the control signal of the PLC control module to lift or lower of the fork of the forklift.

2. The hydraulic control system according to claim 1, wherein the hydraulic valve group control module and the hydraulic module are provided as an integrated hydraulic valve assembly, and the hydraulic valve group control module is connected with the hydraulic module by a hose.

3. The hydraulic control system according to claim 1, wherein the PLC control module is further configured to perform a signal processing on the operation instruction inputted by the manipulation module to determine the control signal corresponding to the operation instruction.

4. The hydraulic control system according to claim 1, wherein the forward/backward unit includes a forward solenoid valve and a backward solenoid valve, the forward solenoid valve and the backward solenoid valve being electrically connected with the PLC control module respectively.

5. The hydraulic valve group control system according to claim 1, wherein the tilt unit includes a forward tilt solenoid valve and a backward tilt solenoid valve, the forward tilt solenoid valve and the backward tilt solenoid valve being electrically connected with the PLC control module respectively.

6. The hydraulic control system according to claim 1, wherein the lateral moving unit includes an opening solenoid valve and a contracting solenoid valve, the opening solenoid valve and the contracting solenoid valve being electrically connected with the PLC control module respectively.

7. The hydraulic control system according to claim 1, wherein the lift unit includes a lift solenoid valve and a lowering solenoid valve, the lift solenoid valve and the lowering solenoid valve being electrically connected with the PLC control module respectively.

8. The hydraulic control system according to claim 1, wherein at least one of the forward/backward switch, the tilt switch, the lateral moving switch, or the lift switch includes an action and a motion parameter corresponding to the action.

9. A forklift, wherein a hydraulic control system is implemented on the forklift, the hydraulic control system comprising:

a hydraulic module, a PLC control module, a hydraulic valve group control module, a manipulation module, and an action module, wherein the manipulation module is connected with the PLC control module and is configured to input an operation instruction to the PLC control module, wherein the manipulation module includes a forward/backward switch, a tilt switch, a lateral moving switch, and a lift switch;

the PLC control module is respectively connected to the hydraulic module and the hydraulic valve group control module, and is configured to output a control signal corresponding to the operation instruction to the hydraulic valve group control module, and control an activation of the hydraulic module to provide hydraulic pressure to the hydraulic valve group control module; and the action module is connected with the hydraulic valve group control module, and is configured to perform an action corresponding to the control signal, wherein the forklift includes a vehicle body, a fork, and a scissor assembly provided between the vehicle body and the fork;

the hydraulic module and the PLC control module are provided on the vehicle body;

a hydraulic valve group control module is provided between the fork and the scissor assembly; and the action module also includes a forward/backward unit, a tilt unit, a lateral moving unit, and a lift unit; and the forward/backward unit, the tilt unit, the lateral moving unit and the lift unit respectively correspond to the forward/backward switch, the tilt switch, the lateral moving switch and the lift switch, wherein a pulley block is provided on an oil line connection between the hydraulic valve group control module and the lift unit, wherein the forward/backward unit is configured to receive the control signal from the PLC control module to cause the fork of the forklift to move forward or backward;

the tilt unit is configured to receive the control signal from the PLC control module to cause the fork of the forklift to tilt forward or backward;

the lateral moving unit is configured to receive the control signal from the PLC control module to cause the fork of the forklift to open toward both sides or contract toward the middle; and the lift unit is configured to receive the control signal of the PLC control module to lift or lower of the fork of the forklift.

10. The forklift according to claim 9, wherein the forklift further includes a gantry disposed at a front end of the vehicle body, and the scissor assembly is capable of moving up and down along the gantry.

11. The forklift according to claim 9, wherein the forward/backward unit includes a forward/backward cylinder disposed on the scissor assembly, wherein one end of the forward/backward cylinder is rotatably connected with a slider of the scissor assembly, and another end of the forward/backward cylinder is rotatably connected with an inner fork plate of the scissor assembly.

12. The forklift according to claim 9, wherein the tilt unit includes a tilt cylinder disposed between the fork and the scissor assembly.

* * * * *